Dec. 5, 1933.  L. C. HUCK  1,937,890
BRAKE
Filed June 30, 1930   2 Sheets-Sheet 1
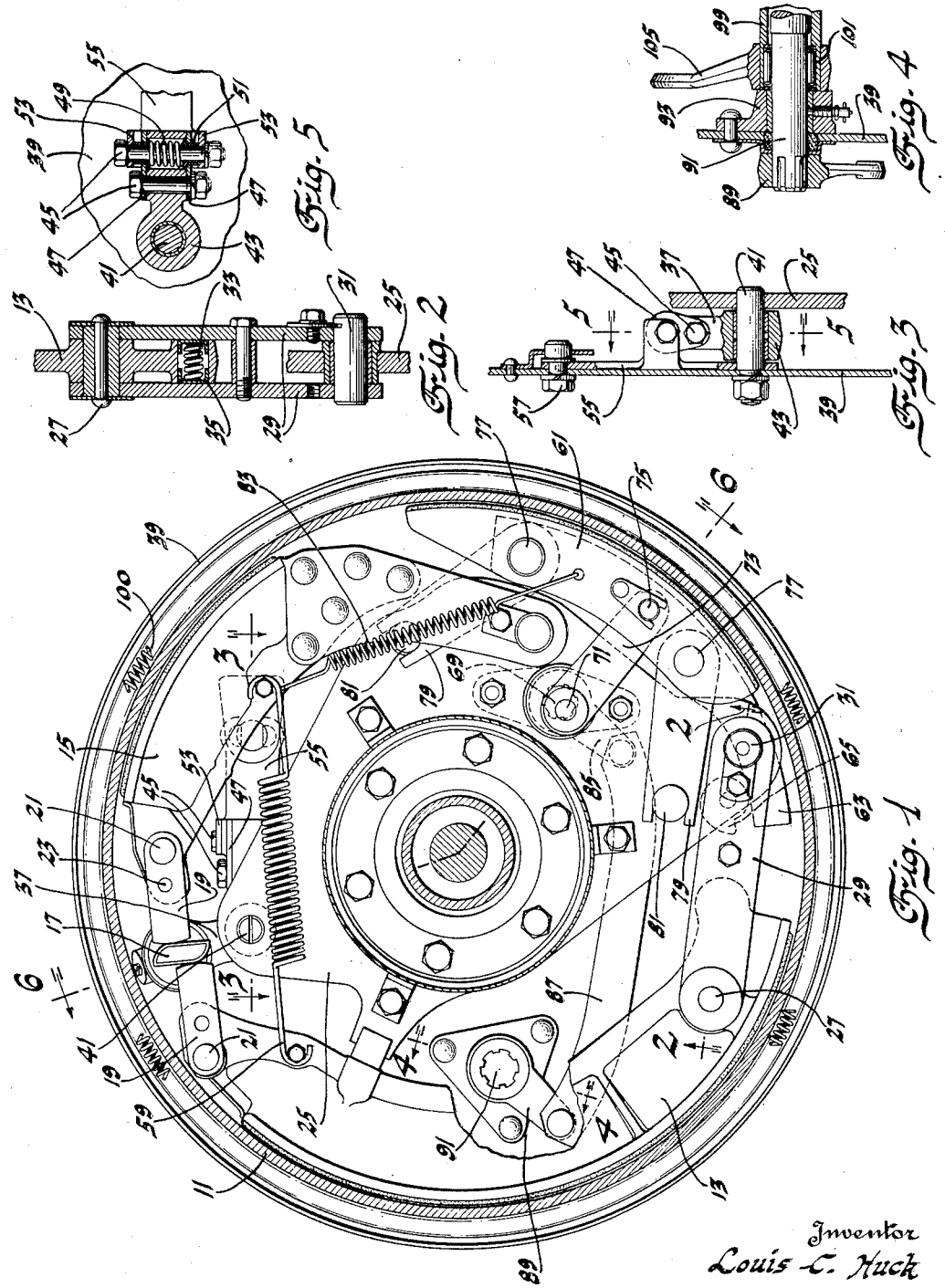
Inventor
Louis C. Huck
By Blackmore, Spencer & Flint
Attorneys Dec. 5, 1933.  L. C. HUCK  1,937,890
BRAKE
Filed June 30, 1930   2 Sheets-Sheet 2
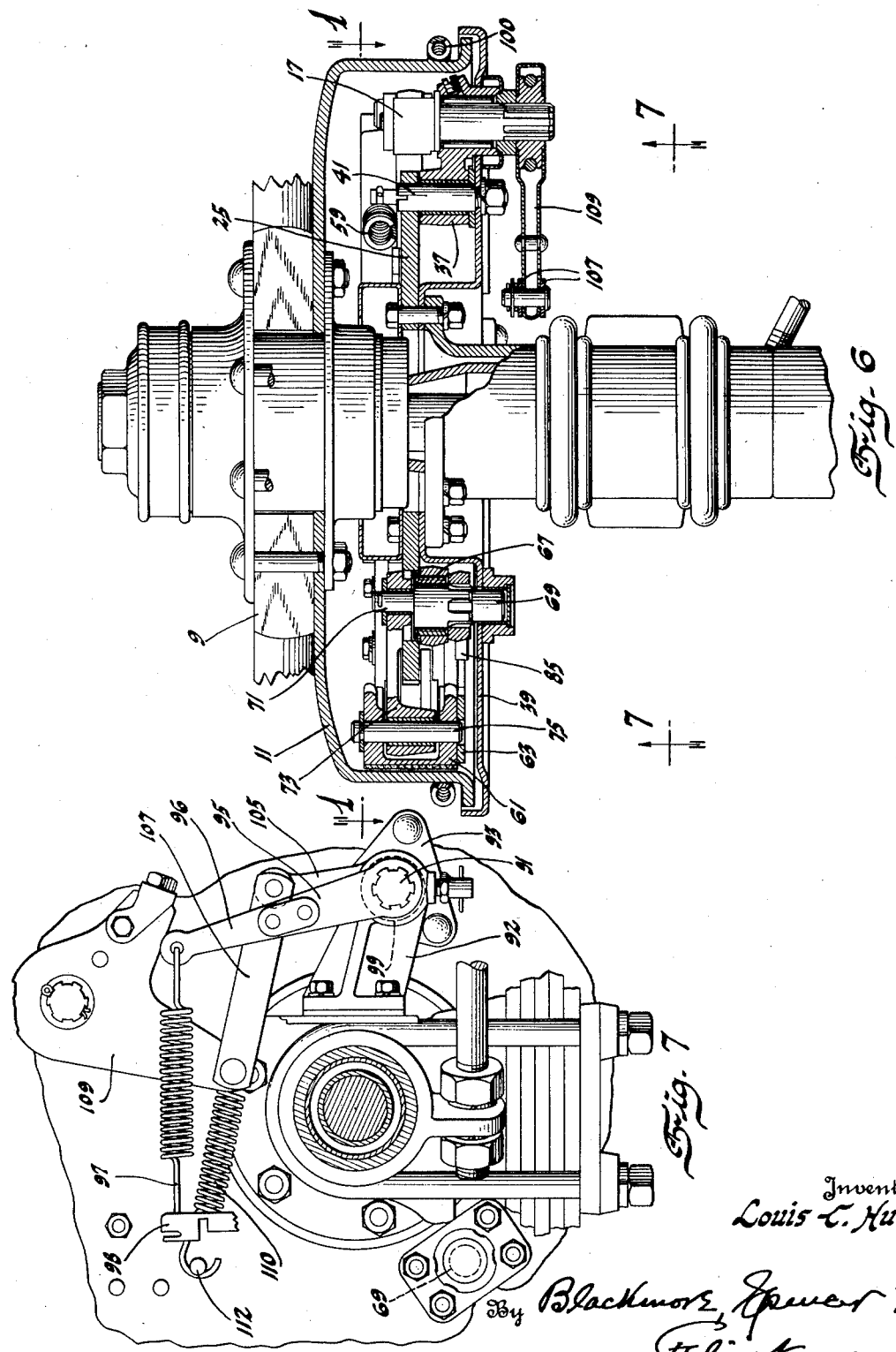
Inventor
Louis C. Huck
By Blackmore, Spear &
Flint
Attorneys

UNITED STATES PATENT OFFICE 1,937,890

BRAKE

Louis C. Huck, New York, N. Y.

Application June 30, 1930. Serial No. 464,853

15 Claims. (Cl. 188—78)

This invention relates to brakes and has been designed more particularly as an improvement in brakes for vehicles.

An object of the invention is to provide an efficient brake which may engage a portion of the drum of a wheel, the larger part of the flange of which drum is used for engagement with braking means already provided therein.

Another object resides in the simple construction of brake mechanism for engaging a drum on a wheel or other rotating member, which mechanism may be used by itself or together with other brake mechanism within said drum.

Other objects and advantages will be understood from the following description.

The invention is illustrated as a shoe brake additionally to what may be considered the major braking mechanism within a drum carried by a vehicle wheel. When so used the shoe may serve as an emergency brake. It is capable of independent operation, or it may be operated simultaneously with other shoes if desired.

In the drawings—

Fig. 1 is a view showing the drum in vertical section, and the shoe mechanism in elevation.

Fig. 2 is a section on line 2—2 of Fig. 1.

Fig. 3 is a section on line 3—3 of Fig. 1.

Fig. 4 is a section on line 4—4 of Fig. 1.

Fig. 5 is a section on line 5—5 of Fig. 3.

Fig. 6 is a plan view of the vehicle axle showing the brake mechanism in section on line 6—6 of Fig. 1.

Fig. 7 is a view in elevation as seen from line 7—7 of Fig. 6.

Referring to the drawings by reference characters, numeral 9 represents a vehicle wheel provided with a brake drum 11 which is internally engaged by shoes 13 and 15. Shoes 13 and 15, constituting the service brake mechanism, are spread into contact with the drum flange by a cam 17. The cam engages rockers 19 which are pivoted to the shoes at 21 and have provision for a limited lost motion about their pivots as at 23. Shoe 13 is a relatively long shoe and is intended to be the more efficient shoe for checking rotation of the drum and wheel when the vehicle is moving forward. This shoe is not directly pivoted to the anchor plate 25 but is pivoted at 27 to a double link 29 which link is itself mounted to turn on a fixed pivot 31. Pivot 27 is spaced from the end of shoe 13 as shown, and link 29 straddles the end of the shoe and covers an opening therein housing a spring 33 which is seated in cups 35, these cups frictionally engaging the link elements 29 to prevent drag of shoe 13 on the drum when the shoe is released and to hold the shoe in positions of adjustment.

The shaft for operating cam 17 is rotatably supported in a carrier 37 pivoted to anchor plate 25, and to the dust guard 39 as shown in Fig. 3. The dust guard has an opening to permit movement of the shaft of the cam 17 as the carrier 37 turns about its pivot 41. Carrier 37 has an angular extension 43 to which are connected by fastening means 45 opposed plates 47. These plates 47 engage the flanged ends of sleeves 51, these sleeves movably receiving the plates 47. The flanged ends of the sleeves engage opposite ends of the coil spring 49. The remote ends of the sleeves engage opposed abutments 53 on a plate 55. This plate 55 is rotatable about pin 41 to positions of adjustment, and may be secured in its several positions of adjustment by fastening means 57 as shown in Fig. 3. A coil spring 59 serves to pull the two shoes into contact with the cam upon release of the operating mechanism, and spring 49 serves to maintain the cam in its centralized position, the latter position of centralization being adjustable to compensate for unequal shoe clearance by the adjustment of plate 55 as explained above.

It will be understood from the above explanation and from the drawings that shoes 13 and 15 constitute the major brake mechanism and these shoes may be considered to be the service brake such as is usually operated by the pedal rather than by the hand or emergency lever.

At 61 is another shoe preferably lying in the plane of shoes 13 and 15, and occupying substantially the space between the anchors of these shoes. This shoe 61 serves as an efficient emergency or parking brake when used independently of shoes 13 and 15, and may be actuated by the conventional emergency lever. It is, however, within the contemplation of the inventor to so hook up the operating mechanism to the several shoes in any way desired. It is more particularly intended, however, that shoe 61 should be an emergency or parking brake operated by the emergency lever and the following description is given with that intended arrangement.

The shoe 61 is preferably of channel shape in section as shown in Fig. 6. On the outer face of one of the walls of this shoe is a plate 63 which extends beyond the shoe proper and to the vicinity of link 29 as shown in Fig. 1. A rotatable cam 65 is provided as shown in dotted lines to engage plate 63 and limit the release position of the emergency shoe. Rotatably supported in the dust guard 39 and in a bearing ring 67 carried by plate 25 is a shaft 69. At its inner end this shaft has a pin 71 eccentrically positioned. Rotatably mounted on this pin is the inner end of a thrust link 73. The outer end of this thrust link lies between the walls of the emergency shoe 61 where it is pivotally connected as by pin 75 located intermediate the length of the arc of the shoe. This structure is shown in Fig. 1. Near each end of the shoe 61 are pivoted by pins 77 links 79. These links extend divergingly with reference to each other from their connections 77 with the shoe. Their other ends are forked and engage pins 81 carried by the plate 25.

A coil spring 83 is attached to shoe 61 between pin 75 and pin 77, which is on the end of the shoe remote from the extension engaged by the cam 65. This spring at its other end is attached to any convenient relatively fixed point. The spring serves to pull the shoe 61 from contact with the drum when such movement is permitted by the release or pressure through link 73. The forked ends of the links 79 slidably engage the respective pins 81. The stop at 65 engages the plate 63 and limits the release movement under the influence of spring 83, tending as it might to rotate shoe 61 clockwise about that pin 77 which is adjacent the spring 83. Any tendency to rock the shoe in an opposite direction is prevented by the engagement of the link 79 adjacent the spring 83 with its stop pin 81.

For actuating the brakes the shaft 69 may have an arm 85 secured thereto and positioned in the drum enclosure. This arm 85 is connected by a link 87, also within the drum, to an arm 89 secured to a shaft 91 rotatably supported by a journal 93 suitably attached to that side of the dust guard 39 outside the drum enclosure. The shaft 91 extends as is usual parallel and along the axle housing and is journaled in a bracket 92 at a point adjacent the differential carrier. It is there provided with an arm 95 for connection with suitable operating mechanism. Its rotary release movement may be effected by a spring 97 connected to an axle bracket 98 and attached to an extended end 96 of arm 95. Surrounding shaft 91 is a sleeve 99, there being means such as a roller bearing 101 to provide free rotation for the sleeve. Adjacent the dust plate and outside the drum enclosure sleeve 99 is provided with an arm 105. A link 107 connects this arm 105 to a lever arm 109 mounted adjustably on the shaft carrying the cam 17. Sleeve 99 has an arm adjacent arm 95 for connection with operating linkage as will be readily appreciated. This last mentioned arm of sleeve 99 is not shown in the drawings, being concealed by arm 95 in Fig. 7. For release action a spring 110 may be connected to an anchoring stud 112 and to arm 109.

As explained above the operating linkage connected to arm 95 and to the arm carried by the sleeve may be of any preferred form.

The brake mechanism involving shoes 13 and 15, the former with its articulated anchorage, is of a known type having a high degree of self-actuation. Such a brake readily conforms to the shape of the drum and may be equipped with lining having a relatively high coefficient of friction. The brake shoe 61 mounted as shown serves as an efficient emergency brake. Rotation of shaft 69 causes the shoe 61 to be thrust in contact with the drum through the instrumentality of thrust link 73. One or the other of links 79, depending upon the direction of drum rotation, tends to assume a more nearly radial direction, the other link guiding the shoe owing to its sliding connection at its pivoted end with one of the studs 81. The release of this emergency shoe is effected, as explained above, by the spring 83 aided by the stop 65.

The drawings also show a spring 100 surrounding the drum. The purpose of this spring is to dampen vibratory noises which might result from the application of the shoes to the drum flange.

I claim:

1. In brake mechanism, a drum, a fixed plate, a shoe to engage said drum, eccentrically operated means, a member reciprocated thereby, said member pivoted to said shoe at a point intermediate its length, links pivoted to said shoe at a point on either side of said intermediate point, means providing a pivotal and slidable movement between the opposite ends of said links and said fixed plate.

2. The invention defined by claim 1, together with a stop engaging one end of said shoe to limit the release movement thereof, and means to resiliently withdraw said shoe from contact with said drum.

3. In brake mechanism, a drum, a fixed plate, a shoe to engage said drum, eccentrically operated means, a member reciprocated thereby, said member pivoted to said shoe at an intermediate point thereof, links pivoted to said shoe at points on either side of the said intermediate point, means providing a pivotal and sliding movement between the opposite ends of said link and said fixed plate, a stop engaging one end of said shoe to limit its movement of release, resilient means connected to said fixed plate and to said shoe between said intermediate point and a pivot of the connecting link remote from the end engaged by the stop.

4. In combination, a brake drum, a service brake comprising shoes engaging said drum, a single emergency shoe engaging said drum in the region between the anchorage of said service shoes, a fixed plate, means to anchor said emergency shoe to the fixed plate, and eccentrically operated means to thrust said shoe into contact with said drum.

5. In combination, a brake drum, a fixed plate, a service brake comprising shoes engaging said drum, a single emergency shoe engaging said drum in the region between the anchorage of said service shoes, means to terminally anchor either end of said emergency shoe to said fixed plate, eccentrically operated means to thrust said shoe into drum contact, said eccentrically operated means including a link pivoted to an intermediate point on said shoe.

6. The invention defined by claim 5, together with links pivoted to said shoe on either side of said intermediate point, said links having a pivotal and sliding connection with said fixed plate.

7. In combination, a brake drum, a fixed plate, a service brake comprising shoes engaging said drum, a single emergency shoe engaging said drum in the region between the anchorage of said shoes, eccentrically operated means to thrust said shoe into contact with said drum, said eccentrically operated means including a link pivoted to an intermediate point on said shoe, links pivoted to said shoe, one on either side of said intermediate point, said other links having a pivotal and sliding connection with said fixed plate, and resilient means to release said shoe from contact with said drum.

8. The invention defined by claim 7, together with a stop to limit the release movement produced by said resilient means.

9. In combination, a drum, a shoe to frictionally engage the drum, a fixed plate, links pivoted to said shoe and fixed plate whereby said shoe has an articulated anchorage for either direction of drum rotation, and means including a substantially radially movable rod to engage said shoe between its link pivots to thrust said shoe into contact with said drum.

10. The invention defined by claim 9, together with resilient means to release said shoe and a stop to limit the release movement of said shoe.

11. The invention defined by claim 9, together with resilient means to release said shoe, a stop to limit said releasing movement, the means to thrust said shoe into drum contact engaging said shoe at an intermediate point thereof, said resilient means engaging said shoe between said intermediate point and the pivotal connection of one of the anchoring links.

12. In brake mechanism, a drum, a fixed plate, a shoe to engage the drum, means movable substantially radially and pivoted to said shoe at an intermediate point thereof to thrust said shoe into drum engagement, and means pivoted to said fixed plate and to said shoe on one side of said intermediate point, said last-mentioned means positioned to directly anchor said shoe whereby it may retard the rotation of the drum when actuated by said first-mentioned means.

13. In brake mechanism, a drum, a fixed plate, a single brake shoe to engage the drum, means movable in a substantially radial direction and pivoted to said shoe at an intermediate point thereof to thrust said shoe into engagement with the drum, and a plurality of links pivoted to said fixed plate and to said shoe on opposite sides of said intermediate point, each of said links operable to directly anchor said shoe whereby it may retard the rotation of the drum when actuated by said means.

14. The invention defined by claim 13, together with means to resiliently release said shoe from said contact with said drum.

15. In brake mechanism, a drum, a fixed plate, a single shoe brake to engage the drum, means movable in a substantially radial direction and pivoted to said shoe at an intermediate point thereof to thrust said shoe into engagement with the drum, and a plurality of links pivoted to said fixed plate and to said shoe on opposite sides of said intermediate point together with a stop to engage one end of said shoe and limit the release movement thereof, and yielding means anchored at one end and engaging said shoe to effect the release movement thereof.

LOUIS C. HUCK.